May 1, 1956      G. N. HUGHES      2,744,241
D.C. METERING SYSTEM
Filed April 15, 1952
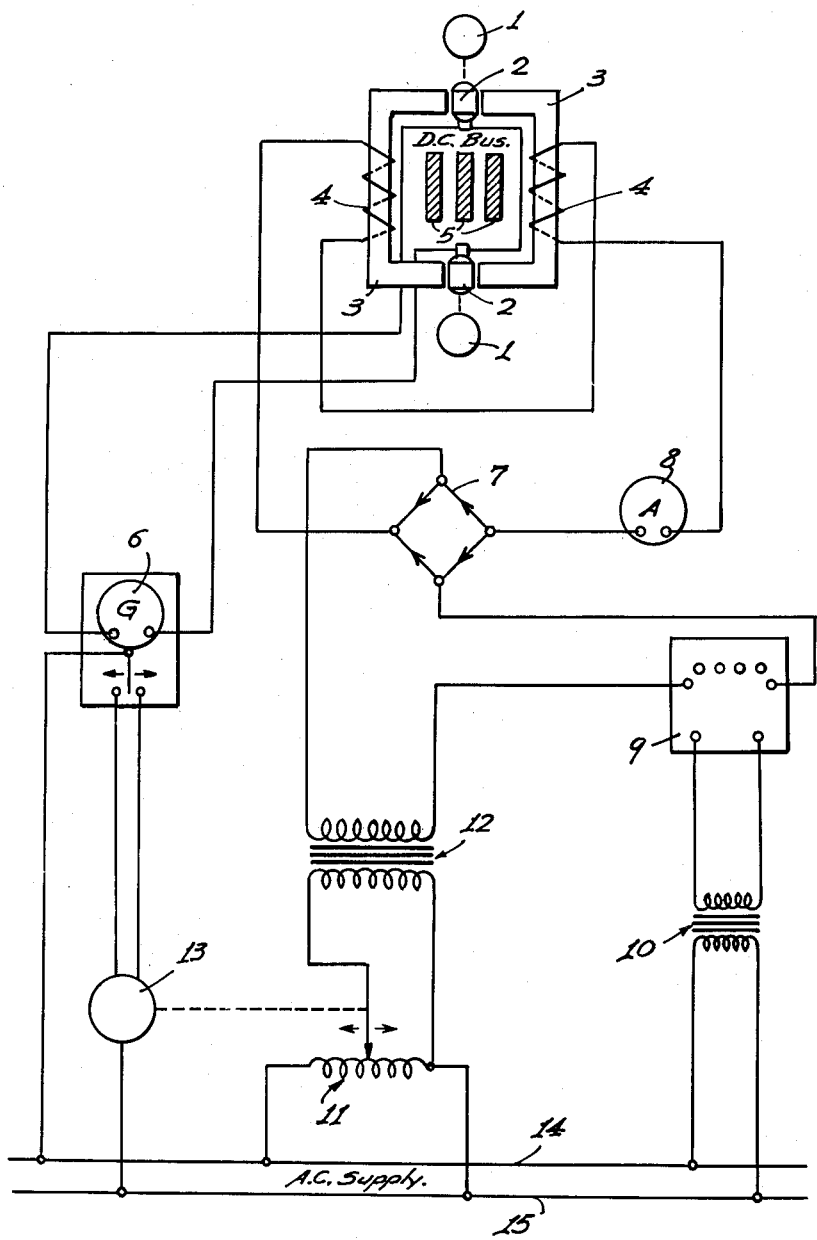
INVENTOR.
Guy N. Hughes.
BY
Robert T. Teeter
ATTORNEY.

United States Patent Office 2,744,241
Patented May 1, 1956

2,744,241

D. C. METERING SYSTEM

Guy N. Hughes, Maryville, Tenn., assignor to Aluminum Company of America, Pittsburgh, Pa., a corporation of Pennsylvania Application April 15, 1952, Serial No. 282,410

3 Claims. (Cl. 324—117)

This invention relates to D. C. metering systems, particularly systems useful for measuring high values of D. C. current, such as are encountered in electrochemical plants. These systems readily lend themselves to integrating D. C. amperes on an A. C. induction watt-hour meter.

A general object of the invention is to provide a D. C. metering system which may be employed without the use of metering shunts in the D. C. line. Further objects include the provision of a D. C. metering system of low cost and one which is readily adaptable to movement from one location to another.

Some of the advantages of the invention are that the metering circuit is insulated from the D. C. line and may be moved from one location to another without de-energizing the D. C. line. Further, the invention permits use of a number of meters, including an integrating meter, and the latter may be an A. C. induction watt-hour meter that may be arranged to read D. C. ampere hours. The invention has the additional advantages that the metering systems are not affected by temperature variation, and also may be arranged to cancel the effect of stray magnetic fields.

Further objects and advantages of the invention will appear from the following description, in connection with the accompanying drawing.

The drawing is an electrical diagram of a preferred form of D. C. metering system, showing the use of both a D. C. indicating meter and an A. C. integrating meter.

In the drawing the D. C. bus 5 carries the line current which is to be metered. A two piece iron magnetic core 3 is mounted around the D. C. bus 5. Thus, the iron magnetic core 3 is in inductive relation to D. C. bus 5 and tends to carry a flux proportional to the current to be metered. A counter-induction winding 4 is distributed over the two parts of the iron magnetic core 3. Winding 4 may be energized so that it tends to induce a flux in the core 3 in a direction opposite to that which the current flowing in the D. C. bus 5 tends to induce.

In the air gaps formed by the separation of the two parts of core 3, there are two small rotating D. C. armatures 2, located opposite each other but in the path of the core flux. These armatures 2 are driven by small constant speed instrument type motors 1. In the event that flux traverses the core 3 in either direction, armatures 2 will generate small currents of corresponding polarity, which currents may be used for control purposes. In the system shown, the coil element of galvanometer relay 6 is connected across or in series with the armatures 2.

Returning now to the counter-excitation winding 4 and its D. C. supply system, it will be noted that winding 4 receives direct current from rectifier 7. An indicating D. C. meter 8 is shown in the D. C. circuit of the rectifier 7 and the winding 4. The rectifier 7 is energized with alternating current from the secondary of transformer 12. The primary of transformer 12 is connected with a variable auto transformer 11, which is connected with the A. C. supply line 14, 15. Also it will be noted that an A. C. induction watt-hour meter has its current coil connected in series with the secondary of transformer 12 and rectifier 7. The potential coil of meter 9 is connected, through a constant voltage transformer 10, with the aforementioned A. C. supply lines 14, 15. This arrangement is such that A. C. induction watt-hour meter 9 serves as an integrating meter for the alternating current fed to rectifier 7. As will appear hereinafter, meter 9 is an integrating meter that provides readings proportional to D. C. ampere hours in the D. C. bus 5.

Returning now to the function of galvanometer relay 6, it will be noted that the contacting element is connected to A. C. supply line 14. The contacting element swings between two contacts, and lines from these contacts run to either of two terminals on controller motor 13. This motor has a further line connecting an opposite terminal to the other A. C. supply line 15. The controller motor 13 operates the movable element of the variable auto transformer 11.

From the above it will be seen that the galvanometer relay 6 and controller motor 13 constitute a control means for the variable A. C. supply circuit to rectifier 7. This control means is used for varying the A. C. supply to the rectifier 7, and thereby varying the D. C. supply to the counter-induction winding 4, in response to current generated in armatures 2 whenever a change in the current in the D. C. bus 5 causes flux to traverse core 3. The function of the control means is to regulate the current in counter-induction winding 4 so that it is proportional to the current in the D. C. bus 5 and so that any flux that momentarily traverses core 3 is reduced to zero. When there is no flux in the core 3, there is no current in the circuit between armatures 2 and galvanometer relay 6. The contacting element of galvanometer relay 6 is then in neutral, and there is no rotation of controller motor 13 nor movement of the movable element of variable auto transformer 11. In this system, therefore, both meter 8 and meter 9 provide readings proportional to the D. C. bus current.

While reference has been made to the use of galvanometer relay 6 and controller motor 13, which together constitute a galvanometer controller, other regulating devices serving the same function can be employed. For example, any suitable, polarized, double throw relay may be used for the same purpose as galvanometer relay 6. Similarly, equivalent electronic balancing equipment could be employed. It is further noted that transformer 12 is not theoretically essential, but has been provided for convenience in obtaining the desired currents in the A. C. and D. C. circuits supplying winding 4. Similarly the variable auto transformer 11 could be inserted in the secondary circuit of transformer 12, rather than in the primary circuit, although it is preferable to have it in the location shown since the current transmitted across the brush or contacts is small in the primary circuit. It may also be observed that transformer 10 is only a convenient element in the system, and could be dispensed with. In fact, the potential coil of meter 9 could be connected across any constant voltage portion of the A. C. system shown.

In the foregoing description of the preferred D. C. metering system, reference has been made to the use of two D. C. armatures 2. Where stray magnetic fields are not present only one of these armatures need be used, and the winding 4 need not be divided in the manner shown. However, where stray magnetic fields are present it is particularly desirable to employ the multipart core 3, the divided winding 4 and at least two armatures 2. In this case it is advantageous to have the armatures 2 located opposite each other, in the flux path of the core parts. This arrangement has the advantage of cancelling the effect of stray magnetic fields such as may come from another near-by bus. Under normal operation the voltage of armatures 2 will simply add. If stray flux passes through the armatures it will increase the voltage of one, but decrease the voltage of the other, so that the effect of stray flux is cancelled.

What is claimed is:

1. A D. C. metering system comprising a multi-part iron magnetic core adapted to be mounted in inductive relation to a D. C. bus with air gaps in said core, a counterinduction winding distributed over said core parts, a variable D. C. supply system for said winding, at least two rotating D. C. armatures located opposite each other in the air gaps in the flux path of said core parts and serving solely as flux detectors and control current generators responsive to the detected flux, a motor for driving said armatures, control means for said variable D. C. supply system, including a normally neutral galvanometer relay connected across said armatures, for varying the D. C. supply to said winding in response to control current generated by said armatures whenever a change in the D. C. bus current causes flux to traverse said core, whereby the current in said winding is regulated in proportion to the current in the D. C. bus and the flux momentarily traversing said core is reduced to zero, and a meter connected in said variable D. C. supply system so as to provide readings proportional to the D. C. bus current.

2. A system for integrating D. C. amperes, on an A. C. induction watt-hour meter, comprising an iron magnetic core adapted to be mounted in inductive relation to a D. C. bus, a counterinduction winding on said core, a variable A. C. supply circuit, a rectifier connected in said A. C. supply circuit, a D. C. supply circuit for said winding connected across said rectifier, a rotating D. C. armature located in the flux path of said core and serving solely as a flux detector and control current generator responsive to the detected flux, a motor for driving said armature, control means for said variable A. C. supply circuit, including a normally neutral galvanometer relay connected across said armature, for varying the A. C. supply and thereby the D. C. supply to said winding in response to control current generated by said armature whenever a change in the D. C. bus current causes flux to traverse said core, whereby the current in said winding is regulated in proportion to the current in the D. C. bus and the flux momentarily traversing said core is reduced to zero, and an A. C. induction watt-hour meter having its current coil connected in said variable A. C. supply circuit and its potential coil connected across a constant voltage portion of said A. C. supply circuit so as to provide readings proportional to D. C. ampere-hours in the D. C. bus.

3. A system for integrating D. C. amperes, on an A. C. induction watt-hour meter, comprising a multi-part iron magnetic core adapted to be mounted in inductive relation to a D. C. bus with air gaps in said core, a counterinduction winding distributed over said core parts, a variable A. C. supply circuit, a rectifier connected in said A. C. supply circuit, a D. C. supply circuit for said winding connected across said rectifier, at least two rotating D. C. armatures located opposite each other in the air gaps in the flux path of said core parts and serving solely as flux detectors and control current generators responsive to the detected flux, a motor for driving said armatures, control means for said variable A. C. supply circuit, including a normally neutral galvanometer relay connected across said armatures, for varying the A. C. supply and thereby the D. C. supply to said winding in response to control current generated by said armatures whenever a change in the D. C. bus current causes flux to traverse said core, whereby the current in said winding is regulated in proportion to the current in the D. C. bus and the flux momentarily traversing said core is reduced to zero, and an A. C. induction watt-hour meter having its current coil connected in said variable A. C. supply circuit and its potential coil connected across a constant voltage portion of said A. C. supply circuit so as to provide readings proportional to D. C. ampere-hours in the D. C. bus.

References Cited in the file of this patent

UNITED STATES PATENTS

| | | |
|---|---|---|
| 1,171,213 | Knopp | Feb. 8, 1916 |
| 2,338,423 | Geyger | Jan. 4, 1944 |
| 2,614,139 | Baxter | Oct. 14, 1952 |
| 2,656,511 | Specht | Oct. 20, 1953 |
| 2,680,221 | Gilbert | June 1, 1954 |

FOREIGN PATENTS

| | | |
|---|---|---|
| 545,210 | Germany | Feb. 26, 1932 |
| 770,264 | France | Sept. 11, 1934 |
| 532,991 | Great Britain | Feb. 4, 1941 |